| United States Patent [19] | [11] 3,819,584 |
| Shima et al. | [45] June 25, 1974 |

[54] PROCESS FOR PREPARATION OF POLYESTERS

[75] Inventors: Takeo Shima; Takayuki Kobayashi; Shoji Kawase; Shizuka Kurisu, all of Iwakuni, Japan

[73] Assignee: Teijin Limited, Osaka, Japan

[22] Filed: June 14, 1972

[21] Appl. No.: 262,747

[52] U.S. Cl............................. 260/75 M, 260/47 C
[51] Int. Cl............................................. C08g 17/01
[58] Field of Search ................................. 260/75 M

[56] References Cited
UNITED STATES PATENTS
3,070,575  12/1962  Cramer................................. 260/47
FOREIGN PATENTS OR APPLICATIONS
1,189,262  4/1970  Great Britain
775,030  5/1957  Great Britain

*Primary Examiner*—Melvin Goldstein
*Attorney, Agent, or Firm*—Sherman & Shalloway

[57]  ABSTRACT

Improved process for producing polyesters which comprises esterifying an aromatic dicarboxylic acid (A) and a bis-$\beta$-hydroxyethyl ester (B) of said acid (A), and then heating the esterified product at reduced pressure in the presence of a polycondensation catalyst, wherein 1. said acid (A) is reacted in an amount in excess of one-half mol and not larger than 6/5 mols per mol of said ester (B), and
2. at a time after the esterification reaction conversion has reached 70%, the ester (B) is additionally supplied in an amount of $x$ mol per mol of the total amount of said acid (A), $x$ being defined by the following equations:
   a. where the mol ($y$) of said acid (A) is $1/2 < y < 8/9$,
   $$0.03\,y - 0.015 \leq x \leq (2y-1)/(y+1) \quad (1)$$

b. where the mol ($y$) of said acid (A) is $8/9 \leq y \leq 6/5$,
   $$0.476\,y - 0.411 \leq x \leq (2y-1)/(y+1) \quad (2)$$

and thereafter, said polycondensation reaction is preformed.

6 Claims, No Drawings

PROCESS FOR PREPARATION OF POLYESTERS

This invention relates to an improved process for producing polyesters of high degrees of polymerization having a high intrinsic viscosity, a low terminal carboxyl group content, a high softening point and reduced coloration within shortened periods of time of esterification reaction and reduced amounts of by-product glycol at the time of polycondensation.

A method has been known to produce polyesters by esterifying an aromatic dicarboxylic acid and a bis-beta-hydroxyethyl ester of said aromatic dicarboxylic acid at least 250°C. in the presence or absence of an esterification catalyst, and then heating the esterified product under reduced pressure in the presence of a polycondensation catalyst (for example, British Patent 775,030).

This type of reaction has the following advantages (1) to (3).

1. Since the bis-$\beta$-hydroxyethyl ester of an aromatic dicarboxylic acid does not substantially contain free glycol, it is not necessary to employ elevated pressures, and the esterification reaction can be performed at sufficiently elevated temperatures even at atmospheric pressure. In addition to this advantage in respect of operation and equipment, this type of reaction also has the advantage that the desired esterification reaction can be performed at atmospheric pressure within very short periods of time.
2. Since the average degree of polymerization of the pre-condensate obtained by esterification becomes extremely high, the amount of ethylene glycol to be distilled out in the subsequent polycondensation reaction can be considerably reduced. As a result, this type of reaction has the advantage that the step of recovering the glycol can be omitted.
3. It has the advantage of obtaining polyesters of extremely high softening points.

These advantages of the prior art, however, are not completely satisfactory, and further improvement is desired. For example, the esterification reaction product mentioned above has a considerably high terminal carboxyl group content, and the polyester obtained by polycondensation of the product has a degree of polymerization which is not so high as to be satisfactory. Furthermore, the resulting polyester contains an unnegligible amount of terminal carboxyl groups, and therefore, the polyester does not possess satisfactory physical and chemical properties. Attempts to reduce the content of terminal carboxyl groups by continuing the reaction until substantially all of the terminal carboxyl groups are converted to hydroxyl groups require the operation of removing water from a waterglycol system by precise distillation, and of course, long periods of time for the esterification and polycondensation reactions. Contrary to expectation, therefore, such a conventional method tends to result in the lowering of the softening point of the resulting polyester.

The inventors of this invention conducted research and development work in order to provide an improved process for producing a polyester from an aromatic dicarboxylic acid and a bis-$\beta$-hydroxyethyl ester of said aromatic dicarboxylic acid which can overcome these disadvantages. Consequently, it has been found that when in the esterification reaction of the aromatic dicarboxylic acid and the bis-$\beta$-hydroxyethyl ester of said aromatic dicarboxylic acid, an additional supply in the hydroxyethyl ester of an amount specified by the formula defined below is added to the reaction system at a time when the esterification reaction conversion reaches at least about 70 %, the esterification reaction and the subsequent polycondensation reaction are extremely accelerated, and the time needed for the polycondensation to form a polyester can be shortened.

It has also been found that by carrying out the reaction in the presence of an additional amount of the bis-$\beta$-hydroxyethyl ester of the specified amount at the specified time describd above, the polyester obtained is a high-molecular-weight polyester of greatly improved properties in respect of intrinsic viscosity, terminal carboxyl group content, softening point, coloration, degree of polymerization, etc., and the amount of the by-product glycol can be extremely reduced, which in turn can lead to the omission of the necessity for recovering the glycol.

The inventors furthered their work based on these findings, and discovered that the addition of an additional supply of the bis-$\beta$-hydroxyethyl ester can be effected at any desired time after the esterification reaction conversion has reached at least 70 %, to obtain substantially the same effect of shortening the reaction time. However, if it is added at too late a stage, the reaction time becomes too long, which is likely to cause deterioration in physical properties to the esterified product and/or polycondensate owing to prolonged exposure to heat. Accordingly, we have found that the additional bis-$\beta$-hydroxyethyl ester should preferably be supplied before these adverse effects are exerted on the esterified product and polycondensate, and this can be accomplished by considering the esterification reaction conditions, the desired properties of the polyester, etc.

It has thus been found that the disadvantages of the prior art can be overcome by reacting the bis-$\beta$-hydroxyethyl ester with a specific amount of the aromatic dicarboxylic acid, adding an additional supply of the bix-$\beta$-hydroxyethyl ester of a specific amount having regard to the specific amount of the dicarboxylic acid at a time after the esterification reaction conversion has reached at least about 70 %, and preferably before the intrinsic viscosity of the esterification reaction reaches 0.35, and then performing the polycondensation reaction.

Accordingly, an object of this invention is to provide an improved process for producing polyesters by esterifying an aromatic dicarboxylic acid and a bis-$\beta$-hydroxyethyl ester of said aromatic dicarboxylic acid and then polycondensing the resulting esterified product.

Another object of this invention is to provide a process for producing high-molecular-weight polyesters having higher intrinsic viscosity, low terminal carboxyl group content, high softening point, and reduced coloration, within shortened esterification time and with reduced amounts of by-product glycol.

Many other objects of this invention along with its advantages will become more apparent from the following description.

The present invention provides a process for producing polyesters which comprises esterifying an aromatic dicarboxylic acid (A) and a bis-$\beta$-hydroxyethyl ester (B) of said aromatic dicarboxylic acid in the presence or absence of an esterification catalyst, and then heating the esterified product at reduced pressure in the presence of a polycondensation catalyst, wherein 1. said dicarboxylic acid (A) is reacted in an amount in excess of one-half mol and not larger than 6/5 mols per mol of said hydroxyethyl ester (B), and
2. at a time after the esterification reaction conversion has reached 70 %, the hydroxyethyl ester (B) is additionally supplied in an amount of $x$ mol per mol of the total amount of said aromatic dicarboxylic acid (A) used for the esterification, $x$ being defined by the following equations:
   a. where the mol ($y$) of said aromatic dicarboxylic acid is $\frac{1}{2} < y < 8/9$,
   $$0.03\,y - 0.015 \leq x \leq (2y-1)/(y+1) \quad (1)$$
   b. where the mol ($y$) of said aromatic dicarboxylic acid is $8/9 \leq y \leq 6/5$,
   $$0.476\,y - 0.411 \leq x \leq (2y-1)/(y+1), \quad (2)$$

and thereafter, said polycondensation reaction is performed.

As previously stated, the esterification reaction of the present invention can be advantageously carried out at atmospheric pressure. But it can also be performed at an elevated or a slightly reduced pressure up to 100 mmHg. absolute.

In the process of this invention, the aromatic dicarboxylic acid (A) is selected from terephthalic acid and 2,6-naphthalene dicarboxylic acid, and the bis-$\beta$-hydroxyethyl ester (B) of said aromatic dicarboxylic acid is selected from bis-$\beta$-hydroxyethyl ester of terephthalic acid and bis-$\beta$-hydroxyethyl ester of 2,6-naphthalene dicarboxylic acid.

The reaction of this invention may be carried out in the copresence of a third component in a amount of not more than 20 mol % based on the total amount of said aromatic dicarboxylic acid, its bis-$\beta$-hydroxyethyl ester, and the third component itself. Therefore, the "esterification reaction of the dicarboxylic acid (A) and the hydroxyethyl ester (B)", as referred to in the present application, means the esterification reaction of these two compounds in the absence or presence of the third component in an amount not greater than 20 mol %.

Examples of such third component include dibasic acids, bis-$\beta$-hydroxyethyl esters of said acids, diols, and ester-forming derivatives of said diols. These compounds may be used alone or in admixture.

In the esterification reaction according to this invention, a part of the dicarboxylic acid (A) may be replaced with another dibasic acid, or a part of the bis-$\beta$-hydroxyethyl ester (B) of said dicarboxylic acid may be replaced with a bis-$\beta$-hydroxyethyl ester of said dibasic acid.

Where a diol is used as a third component, it can be added before the completion of the polycondensation reaction. But since the amount of the diol to be distilled out necessarily increases, it is preferred that a part of the hydroxyethyl ester of an aromatic dicarboxylic acid should be replaced by an ester of the dicarboxylic acid derived from said diol.

More specifically, examples of the third component are dibasic acids, e.g. aliphatic dicarboxylic acid such as oxalic acid, succinic acid, adipic acid or sebasic acid, alicyclic dicarboxylic acids such as cyclobutanedicarboxylic acid, hexahydroterephthalic acid or hexahydroisophthalic acid, aromatic dicarboxylic acids such as phthalic acid, isophthalic acid, terephthalic acid (when said dicarboxylic acid used for the esterification reaction is 2,6-naphthalene dicarboxylic acid), methylisophthalic acid, methylterephthalic acid, naphthalene-2,6-dicarboxylic acid (where said dicarboxylic acid is terephthalic acid) or naphthalene-2,7-dicarboxylic acid; carboxylic acids such as diphenylether dicarboxylic acid, diphenyl sulfonedicarboxylic acid, diphenoxyethanedicarboxylic acid, or sodium 3,-5-dicarboxybenzenesulfonate, and hydroxycarboxylic acids such as glycolic acid, p-hydroxybenzoic acid or p-$\beta$-hydroxyethoxybenzoic acid, diols, e. g. propylene glycol, trimethylene glycol, diethylene glycol, tetramethylene glycol, hexamethylene glycol, neopentylene glycol, p-xylylene glycol, 1,4-cyclohexane dimethanol, bisphenol-A, p,p'-dihydroxydiphenyl sulfone 1,4-bis($\beta$-hydroxyethoxy) benzene, 2,2'-bis(p-$\beta$-hydroxyethoxyphenyl) propane, polyalkylene glycols, or p-phenylene bis(dimethylsiloxane) diol, and ester-forming derivatives thereof. Furthermore, it is possible to copolymerize a compound having one ester-forming functional group, such as benzoic acid, naphthoic acid, benzoyl benzoic acid, m-benzyloxybenzoic acid, or me-thoxypolyalkylene glycols with the termini of the copolyester. Also, it is possible to copolymerize a compound having at least three ester-forming functional group, such as glycerol, pentaerythritol, trimethylolpropane, 5-hydroxyisophthalic acid, trimellitic acid or trimesic acid, or ester-forming derivatives thereof in a manner such that the resulting copolymer is substantially linear.

If the amount of the aromatic dicarboxylic acid (A) is less than one-half mol, the polyester obtained tends to have a lower softening point, and at the same time, the amount of the by-product glycol increases, thus not bringing about advantage (2) mentioned above. If, on the other hand, it is far in excess of 6/5 mols, the resulting polyester has a large content of terminal carboxyl groups and a low intrinsic viscosity, leading to poor quality and low degree of polymerization.

In the present invention, the esterification reaction can be performed under the conditions which satisfy the specific mol ratios of the reactants specified in (1) in the absence or presence of a known esterification reaction catalyst or an ether-formation inhibitor by heating the above reactants so that at the later stage of the reaction the temperature will rise to at least 250°C. At this time, the presence of a polycondensation catalyst substantially having an ester-interchange ability, such as antimony, germanium or titanium compounds is disadvantageous since it accelerates the ester-interchange reaction and the distilling of glycol out of the system. At this time, it is preferred that the reaction be performed while removing water and a small amount of glycol formed by the reaction by evaporation. Some examples of the known esterification reaction catalysts are weak acid salts or strong acid salts of alkali metals, and organic bases such as quaternary ammonium hydroxide or phosphonium hydroxide. The dicarboxylic acid (A) and hydroxyethyl ester (B) may be fed from the start in the amounts specified, or may be added in portions. Alternatively the reaction may be carried out while adding these reactants continuously. The hydroxyethyl ester (B) which is added continuously or in portions before the esterification reaction conversion reaches 70 % does not produce the effect of an additional supply of the hydroxyethyl ester used in this invention.

The esterification reaction may be performed usually at atmospheric pressure while heating, and at the later stage of the reaction the temperature reaches at least 250°C., preferably at at least 265°C. If the temperature is lower than 250°C., very long periods of time are required for the esterification reaction, and the precondensate is likely to solidify if its average degree of polymerization produces a heptamer or higher polymer.

One of the most important features of this invention is that an additional supply of the hydroxyethyl ester (B) is added to the reaction system at the specified time in an amount specified by the equations (a) and (b).

The time of addition is after the esterification reaction conversion has reached 70 %, preferably before the intrinsic viscosity of the esterified product reaches 0.35, especially preferably when the esterification reaction conversion is about 75 to about 90 %. Even if this additional supply of the hydroxyethyl ester (B) is added at a stage when the esterification reaction conversion is less than 70 %, the polyester obtained has a large terminal by carboxyl group content and a low intrinsic viscosity.

It is more preferred that in addition to the equations (1) and (2) above, the amount of the additional hydroxyethyl ester (B) should satisfy the equation $x \leq 240.3$, especially $x \leq 0.26$.

More preferably, the additional hydroxyethyl ester (B) is supplied in an amount of $x$ mols defined by the following equations (1)′ and (2)′.

a. where the mol ($y$) of the dicarboxylic acid (A) is ½ < $y$ < 8/9, then $$0.06y - 0.03 \leq x \leq (2y - 1)/(y + 1) \qquad (1)'$$

b. where the mol ($y$) of the dicarboxylic acid (A) is 8/9 ≤ $y$ ≤ 6/5, then $$0.476y - 0.401 \leq x \leq 0.22y - 0.01 \qquad (2)'$$

It is also possible to react the dicarboxylic acid (A) in an amount above one-half mol but less than eight-ninths mol per mol of the hydroxyethyl ester (B), and add $x$ mol of the hydroxyethyl ester (B) per mol of the total amount of the aromatic dicarboxylic acid at a time after the esterification reaction conversion has reached about 70 %, $x$ mol being defined by the following equations a. where the mol ($y$) of the dicarboxylic acid (A) is ½ $y$ = 0.5968, then $$0.03\,y - 0.015 < x \leq (2y - 1)/(y + 1) \qquad (1)''$$

b. where the mol ($y$) of the dicarboxylic acid (A) is 0.5968 < $y$ < 8/9, then $$0.03\,y - 0.015 < x \leq 0.22y - 0.01 \qquad (2)''$$

The esterification reaction conversion P(%) in the present invention can be calculated by the following equation after neutralization titration by the Conix's method described in Macromol. Chem., 26, 226 (1958).

$$P(\%) = (1 - [COOH]/2y \times [\Sigma(MW_{(B)} \times f_{(B)}) + y \times \Sigma(MW_{(A)} \times f_{(A)}) - Q]/10^6) \times 100$$

wherein $y$ is the same as defined above, [COOH] is the carboxyl group value (equivalents/$10^6$ g), $MW_{(B)}$ is the molecular weight of the hydroxyethyl ester (B), $MW_{(A)}$ is the molecular weight of the dicarboxylic acid (A), $f_{(B)}$ is the mol ratio of the hydroxyethyl ester (B) to the total mols of the hydroxyethyl ester, $f_{(A)}$ is the mol ratio of the dicarboxylic acid (A) to the total mols of the dicarboxylic acids used, and Q is the amount of the liquid distilled out from the reaction system per mol of the hydroxyethyl ester and $y$ mol of dicarboxylic acid, and $\Sigma$ means summation.

In the requirement (2) of the present invention, the total mols of the aromatic dicarboxylic acid is the total of the mols of the dicarboxylic acid (A) and the dicarboxylic acid component constituting the hydroxyethyl ester (B) of said dicarboxylic acid.

It is not necessary to perform the polycondensation reaction immediately after addition of further hydroxyethyl ester (B), but it may be performed after continuing the esterification reaction for some time.

If a large quantity of the hydroxyethyl ester (B) is added while the esterification reaction conversion is less than 70 % but not too low, it is possible to produce a polyester with a small content of terminal carboxyl group content. This, however, brings about the disadvantage of a useless increase in the amount of the hydroxyethyl ester (B) and an increase in the amount of the by-product glycol, and the resulting polyester has a lowered softening point.

When the amount of the hydroxyethyl ester (B) to be added at a time after the esterification reaction conversion has reached 70 % is too large beyond the range defined by the above equations, the amount of the by-product glycol increases, and the hydroxyethyl ester (B) and its oligomers also distill out and solidify, which tend to cause operational troubles. Furthermore, the color of the resulting polyester becomes poor, or the softening point of the polyester becomes low. On the other hand, if the amount is smaller than the range specified, it is impossible to obtain a polyester of a satisfactory degree of polymerization, and moreover, the polyester obtained has a large content of terminal carboxyl groups.

The polycondensation reaction conditions and operation are well known. Usually, the polycondensation is performed in the presence of a polycondensation catalyst at at least 260°C. at reduced pressure, for example, at 1 mmHg absolute or less until the desired degree of polymerization while removing water and ethylene glycol formed out of the reaction system. Examples of the polycondensation catalyst are titanium, antimony, germanium, and a compound of each of these, or a mixture of these.

The polycondensation reaction may be carried out at atmospheric pressure to 30 mm Hg absolute at an early stage, and after a lapse of time, at lower pressures. Since it is possible to prevent the distillation of the hydroxyethyl ester (B) additionally supplied, this is a preferred embodiment of operation.

The terminal carboxyl group content, softening point, intrinsic viscosity, and the coloration (color of the polyester) are measured by the following methods.

1. Terminal carboxyl group content:

According to A. Conix's method (Makromol. Chem. 26, 226 (1958)), 0.1 g of the sample is dissolved in 10 ml. of benzyl alcohol, and 10 ml. of chloroform is further added thereto. Using phenol red as an indicator, neutralization titration are performed with a solution of sodium hydroxide in benzyl alcohol. The measured values are indicated in equivalents per $10^6$ grams.

2. Softening point:

Measured by a Vicat-type measuring apparatus.

3. Intrinsic viscosity:

Calculated from a value in ortho-chlorophenol at 35°C.

4. Degree of coloration:

1, a and b denote those of Hunter's Color Diagram, wherein L stands for lightness, the greater the L value the color being lighter; positive side of a means red and negative side of a means green; whereas positive side of b means yellow and negative side of b means blue. The greater the absolute value of a and b, the deeper the color shade.

5. Amount of ethylene glycol distilled:

Determined by measurement of the amount, density and temperature of the liquid distilled out from the reaction system and means the amount (Kg) of the by-product glycol per 100 Kg polymer.

The invention will now be illustrated by the following Examples and Comparative Examples.

EXAMPLES 1 TO 6 AND COMPARATIVE EXAMPLES 1 TO 21

A reactor equipped with a distillation device and a stirrer was charged with an aromatic dicarboxylic acid and a bis-β-hydroxyethyl ester of the aromatic dicarboxylic acid of the amounts indicated in Table 1 below, and they were reacted by heating at a bath temperature of 285°C. at atmospheric pressure while distilling off water and ethylene glycol formed by the reaction. The reaction was continued for the time indicated in Table 1, and when the esterification reaction conversion reached the value indicated in Table 1, an additional supply of the bis-β-hydroxyethyl ester of the aromatic carboxylic acid of the amount shown in Table 1 was fed.

Then, a stabilizer and a polycondensation catalyst composed of 0.118 part by weight (0.027 mol % based on the total aromatic dicarboxylic acid units) of antimony trioxide and 0.105 part by weight (0.05 mol % based on the total aromatic dicarboxylic acid units) of trimethyl phosphate were added. After completion of the addition, the reaction was continued for 5 minutes at atmospheric pressure, and then the reaction pressure was reduced to 30 mmHg absolute in the course of 15 minutes, and further to 3 mmHg absolute in the course of 20 minutes, and still further to 0.3 mmHg absolute, to effect the polycondensation reaction of the esterified product. The reaction time after the addition of the polycondensation catalyst is shown in Table 1. The properties of the polyester obtained are shown in Table 1.

Table 1 shows the results of some experiments performed in accordance with the process of this invention and those of comparative experiments which were conducted in the same way except an additional supply of the hydroxyethyl ester (B) was not fed to the reaction system. The following abbreviations are used in the table.

BET: bis-β-hydroxyethyl terephthalate
BEN: bis-β-hydroxyethyl 2,6-naphthalene dicarboxylate
TPA: terephthalic acid
2,6DNA: naphthalene-2,6-dicarboxylic acid Furthermore, Table 2 shows the results of comparative examples in which the mol ratio of the acid (A) to the hydroxyethyl ester (B) and the time of addition and the amount of the additional hydroxyethyl ester (B) were not within the ranges specified in the present invention. For ease of comparison, the results of Examples 1, 2, 5 and 6 are also given in Table 2.

The effect of adding BET or BEN is clear from the comparison of Examples 1 and 3 with Comparative Example 1, Examples 2 and 4 with Comparative Example 2, and Example 5 with Comparative Example 5. It is also clear from the comparison of Example 1 with Comparative Example 3, Example 2 with Comparative EXample 4, and Example 6 with Comparative Example 6 that even if BET is incorporated in the reaction system from the outset of the reaction, the effect intended by this invention cannot be obtained.

Table 1

| | Aromatic dicarboxylic acid (A) | | Bis-β-hydroxyethyl ester (B) of the aromatic dicarboxylic acid | | Reaction temperature (°C.) | Reaction time (min) | Product of the time of adding hydroxyethyl ester (B) | | Amount of ester (B) (mol) |
|---|---|---|---|---|---|---|---|---|---|
| | Kind | Amount (mol) | Kind | Amount (mol) | | | Esterification reaction conversion (%) | Terminal carboxyl content (equivalent/$10^6$ gram) | |
| Examples | | | | | | | | | |
| 1 | TPA | 0.623 | BET | 0.831 | 282 | 125 | 79 | 890 | 0.046 |
| 2 | TPA | 0.666 | BET | 0.710 | 282 | 125 | 82 | 880 | 0.124 |
| 3 | TPA | 0.559 | BET | 0.745 | 282 | 125 | 80 | 840 | 0.196 |
| 4 | TPA | 0.581 | BET | 0.619 | 282 | 125 | 83 | 830 | 0.30 |
| 5 | 2,6-DNA | 0.618 | BEN | 0.771 | 282 | 160 | 81 | 640 | 0.111 |
| 6 | 2,6-DNA | 0.635 | BEN | 0.669 | 283 | 160 | 83 | 660 | 0.196 |

Table 1—Continued

Polycondensation / Polymer obtained

| | Reaction temperature (°C.) | Reaction time (min) | Amount of total ethylene glycol distilled out (Kg/100Kg Polymer) | Intrinsic viscosity (η) | Softening point (°C.) | Terminal Carboxyl Content (equivalent/$10^6$ gram) | Degree of coloration | | |
|---|---|---|---|---|---|---|---|---|---|
| | | | | | | | L | a | b |
| Examples | | | | | | | | | |
| 1 | 285 | 127 | 2.75 | 0.634 | 262.8 | 30.8 | 72.5 | −2.0 | 3.0 |
| 2 | 285 | 120 | 1.81 | 0.650 | 262.5 | 31.8 | 72.2 | −2.1 | 3.6 |
| 3 | 285 | 120 | 4.10 | 0.640 | 262.1 | 25.2 | 71.3 | −2.1 | 2.0 |
| 4 | 285 | 120 | 3.63 | 0.629 | 262.9 | 29.5 | 69.8 | −1.9 | 2.0 |
| 5 | 290 | 120 | 2.24 | 0.640 | 272.8 | 30.0 | 72.0 | −1.1 | 3.7 |
| 6 | 290 | 120 | 1.95 | 0.635 | 272.9 | 31.5 | 71.5 | −1.0 | 3.9 |

Esterification

| | Aromatic dicarboxylic acid (A) | | Bis-β-hydroxyethyl ester (B) of the aromatic dicarboxylic acid | | Reaction temperature (°C.) | Reaction time (min) | Product of the time of adding hydroxyethyl ester (B) | | Amount of ester (B) (mol) |
|---|---|---|---|---|---|---|---|---|---|
| | Kind | Amount (mol) | Kind | Amount (mol) | | | Esterification reaction conversion (%) | Terminal carboxyl content (equivalent/$10^6$ gram) | |
| Comparative Example | | | | | | | | | |
| 1 | TPA | 0.643 | BET | 0.857 | 282 | 125 | 79 | 890 | 0 |
| 2 | TPA | 0.726 | BET | 0.774 | 282 | 125 | 85 | 720 | 0 |
| 3 | TPA | 0.623 | BET | 0.877 | 281 | 125 | 79 | 840 | 0 |
| 4 | TPA | 0.667 | BET | 0.833 | 282 | 125 | 80 | 880 | 0 |
| 5 | 2,6-DNA | 0.667 | BEN | 0.833 | 282 | 160 | 81 | 650 | 0 |
| 6 | 2,6-DNA | 0.635 | BEN | 0.865 | 282 | 160 | 82 | 670 | 0 |

Polycondensation / Polymer obtained

| | Reaction temperature (°C.) | Reaction time (min) | Amount of Total ethylene glycol distilled out (Kg/100Kg Polymer) | Intrinsic viscosity (η) | Softening point (°C.) | Terminal Carboxyl Content (equivalent/$10^6$ gram) | Degree of coloration | | |
|---|---|---|---|---|---|---|---|---|---|
| | | | | | | | L | a | b |
| Comparative Examples | | | | | | | | | |
| 1 | 285 | 180 | 2.30 | 0.592 | 263.5 | 82.0 | 75.5 | −1.9 | 4.0 |
| 2 | 285 | 180 | 0.51 | 0.483 | 264.7 | 118.0 | 81.8 | −2.0 | 7.0 |
| 3 | 285 | 135 | 2.73 | 0.602 | 262.9 | 40.5 | 73.8 | −2.2 | 3.6 |
| 4 | 285 | 180 | 1.79 | 0.590 | 262.9 | 85.0 | 75.2 | −1.9 | 4.5 |
| 5 | 290 | 180 | 1.42 | 0.590 | 273.6 | 85.0 | 73.8 | −1.1 | 4.2 |
| 6 | 290 | 145 | 1.95 | 0.610 | 273.3 | 45.6 | 72.0 | −1.1 | 4.8 |

Table 2

Esterification

| | Aromatic dicarboxylic acid (A) | | Bis-β-hydroxyethyl ester (B) of the aromatic dicarboxylic acid | | Reaction temperature (°C) | Reaction time (min) | Product of the time of adding hydroxyethyl ester (B) | | Amount of ester (B) (mol) |
|---|---|---|---|---|---|---|---|---|---|
| | Kind | Amount (mol) | Kind | Amount (mol) | | | Esterification reaction conversion (%) | Terminal carboxyl content (equivalent/$10^6$ gram) | |
| Examples | | | | | | | | | |
| 1 | TPA | 0.623 | BET | 0.831 | 282 | 125 | 79 | 890 | 0.046 |
| 2 | TPA | 0.666 | BET | 0.710 | 282 | 125 | 82 | 880 | 0.124 |
| 5 | 2,6-DNA | 0.618 | BEN | 0.771 | 282 | 160 | 81 | 640 | 0.111 |
| 6 | 2,6-DNA | 0.635 | BEN | 0.669 | 283 | 160 | 83 | 660 | 0.196 |
| Comparative Examples | | | | | | | | | |
| 7 | TPA | 0.666 | BET | 0.524 | 283 | 155 | 72 | 1620 | 0.310 |
| 8 | TPA | 0.420 | BET | 1.050 | 275 | 105 | 77 | 610 | 0.030 |
| 9 | 2,6-DNA | 0.666 | BEN | 0.524 | 282 | 190 | 63 | 1680 | 0.310 |
| 10 | 2,6-DNA | 0.420 | BEN | 1.050 | 282 | 135 | 77 | 490 | 0.030 |

Table 2—Continued

| | Polycondensation | | | Polymer obtained | | | | | |
|---|---|---|---|---|---|---|---|---|---|
| | Reaction temperature (°C.) | Reaction time (min) | Amount of Total ethylene glycol distilled out (Kg/100Kg Polymer) | Intrinsic viscosity ($\eta$) | Softening point (°C.) | Terminal Carboxyl Content (equivalent/ $10^6$ gram) | Degree of coloration | | |
| | | | | | | | L | a | b |
| Examples | | | | | | | | | |
| 1 | 285 | 127 | 2.75 | 0.634 | 262.8 | 30.8 | 72.5 | −2.2 | 3.0 |
| 2 | 285 | 120 | 1.81 | 0.670 | 262.5 | 27.4 | 72.2 | −3.0 | 3.6 |
| 5 | 290 | 120 | 2.24 | 0.640 | 272.8 | 30.0 | 72.0 | −1.1 | 3.7 |
| 6 | 290 | 120 | 1.95 | 0.635 | 272.9 | 31.5 | 71.5 | −0.9 | 3.9 |
| Comparative Examples | | | | | | | | | |
| 7 | 285 | 180 | 1.80 | 0.475 | 264.5 | 118.0 | 75.9 | −2.1 | 5.2 |
| 8 | 285 | 110 | 7.09 | 0.650 | 262.0 | 25.6 | 70.8 | −1.8 | 0.8 |
| 9 | 290 | 180 | 1.43 | 0.490 | 273.5 | 115.0 | 75.8 | −1.1 | 5.2 |
| 10 | 290 | 120 | 5.63 | 0.650 | 271.5 | 26.5 | 70.8 | −1.2 | 2.0 |

Esterification

| | Aromatic dicarboxylic acid (A) | | Bis-βhydroxyethyl ester (B) of the aromatic dicarboxylic acid | | Reaction temperature (°C.) | Reaction time (min) | Product of the time of adding hydroxyethyl ester (B) | | Amount of ester (B) (mol) |
|---|---|---|---|---|---|---|---|---|---|
| Comparative Examples | Kind | Amount (mol) | Kind | Amount (mol) | | | Esterification reaction conversion (%) | Terminal carboxyl content (equivalent/$10^6$ gram) | |
| 11 | TPA | 0.623 | BET | 0.831 | 278 | 70 | 58 | 1720 | 0.046 |
| 12 | 2,6-DNA | 0.618 | BEN | 0.771 | 279 | 95 | 60 | 1390 | 0.111 |
| 13 | TPA | 0.459 | BET | 0.612 | 282 | 125 | 79 | 890 | 0.429 |
| 14 | TPA | 0.640 | BET | 0.854 | 282 | 125 | 79 | 900 | 0.006 |
| 15 | TPA | 0.465 | BET | 0.496 | 282 | 125 | 83 | 820 | 0.538 |
| 16 | TPA | 0.712 | BET | 0.759 | 282 | 125 | 83 | 810 | 0.029 |
| 17 | 2,6-DNA | 0.465 | BEN | 0.575 | 282 | 160 | 81 | 640 | 0.466 |
| 18 | 2,6-DNA | 0.664 | BEN | 0.830 | 282 | 160 | 81 | 640 | 0.006 |
| 19 | 2,6-DNA | 0.457 | BEN | 0.481 | 283 | 160 | 83 | 670 | 0.562 |
| 20 | 2,6-DNA | 0.716 | BEN | 0.754 | 283 | 160 | 81 | 750 | 0.029 |
| 21* | TPA | 0.623 | BET | 0.831 | 278 | 130 | 79 | 915 | 0.046 |

(* Antimony oxide was added at the start of the esterification.)

| | Polycondensation | | | Polymer obtained | | | | | |
|---|---|---|---|---|---|---|---|---|---|
| | Reaction temperature (°C.) | Reaction time (min) | Amount of Total ethylene glycol distilled out (Kg/100Kg Polymer) | Intrinsic viscosity ($\eta$) | Softening point (°C.) | Terminal Carboxyl Content (equivalent/ $10^6$ gram) | Degree of coloration | | |
| | | | | | | | L | a | b |
| Comparative Examples | | | | | | | | | |
| 11 | 285 | 180 | 2.75 | 0.598 | 262.9 | 75.0 | 74.4 | −2.1 | 3.6 |
| 12 | 290 | 180 | 2.25 | 0.600 | 273.0 | 58.0 | 73.8 | −1.1 | 3.9 |
| 13 | 285 | 120 | 6.25 | 0.650 | 261.8 | 24.5 | 66.5 | −2.0 | 0.6 |
| 14 | 285 | 150 | 2.35 | 0.620 | 262.9 | 45.0 | 73.5 | −1.9 | 3.6 |
| 15 | 285 | 120 | 6.12 | 0.655 | 261.2 | 23.5 | 65.5 | −2.0 | 0.7 |
| 16 | 285 | 180 | 0.82 | 0.535 | 264.0 | 80.0 | 75.6 | −2.1 | 4.0 |
| 17 | 290 | 120 | 4.95 | 0.650 | 271.8 | 26.0 | 69.2 | −1.9 | 3.0 |
| 18 | 290 | 150 | 1.47 | 0.592 | 273.4 | 65.5 | 72.9 | −2.1 | 5.0 |
| 19 | 290 | 120 | 5.00 | 0.640 | 271.8 | 25.5 | 68.8 | −2.3 | 2.0 |
| 20 | 290 | 180 | 0.57 | 0.515 | 274.5 | 90.5 | 73.0 | −2.0 | 4.2 |
| 21* | 285 | 150 | 2.75 | 0.508 | 263.5 | 102.0 | 76.5 | −2.1 | 6.0 |

EXAMPLES 7 to 11

The procedure of Example 1 was repeated except that the third component in an amount of less than 20 mol % was not used, and the conditions were varied. The conditions and the results obtained are shown in Table 3.

Table 3

| | Aromatic dicarboxylic acid (A) | | Bis-β-hydroxyethyl ester (B) of the aromatic dicarboxylic acid | | Reaction temperature (°C.) | Reaction time (min) | Product of the time of adding hydroxyethyl ester (B) | | Amount of ester (B) | |
|---|---|---|---|---|---|---|---|---|---|---|
| | | | | | | | Esterification reaction conversion (%) | Terminal carboxyl content (equivalent)10⁶ gram | | |
| | Kind | Amount (mol) | Kind | Amount (mol) | | | | | | (mol) |
| Examples | | | | | | | | | | |
| 7 | TPA | 0.618 | BET | 0.659 | 282 | 120 | 82 | 730 | BET | 0.058 |
| | | | BEN | 0.165 | | | | | | |
| 8 | TPA Isophthalic acid | 0.495 0.124 | BET | 0.824 | 282 | 120 | 80 | 840 | do. | 0.058 |
| 9* | TPA | 0.629 | BET | 0.571 | 278 | 140 | 82 | 965 | do. | 0.300 |
| 10 | TPA | 0.618 | BET | 0.165 | 282 | 135 | 81 | 805 | do. | 0.058 |
| | | | BET | 0.659 (fed continuously with 120 mins) | | | | | | |
| 11 | 2,6-DNA 2,7-DNA | 0.522 0.113 | BEN | 0.669 | 282 | 160 | 83 | 655 | BEN | 0.196 |

*At the start of the esterification, 0.5 mol % of lithium acetate anhydride was added.
**Calculated using the same Huggins' constant as in polyethylene terephthalate.

| | Polycondensation | | | Polymer obtained | | | | | |
|---|---|---|---|---|---|---|---|---|---|
| | Reaction temperature (°C.) | Reaction time (min) | Amount of Total ethylene glycol distilled out (Kg/100Kg) Polymer | Intrinsic viscosity (η) | Softening point (°C.) | Terminal Carboxyl Content (equivalent/ 10⁶ gram) | Degree of coloration | | |
| | | | | | | | L | a | b |
| Examples | | | | | | | | | |
| 7 | 280 | 125 | 2.75 | 0.634** | 238.0 | 23.2 | 71.8 | −1.8 | 2.8 |
| 8 | 280 | 125 | 2.83 | 0.640** | 235.5 | 22.5 | 69.9 | −2.0 | 3.1 |
| 9* | 285 | 120 | 2.61 | 0.635 | 262.9 | 31.5 | 69.9 | −2.0 | 3.3 |
| 10 | 285 | 120 | 2.83 | 0.632 | 263.1 | 28.5 | 73.0 | −1.9 | 3.2 |
| 11 | 290 | 120 | 1.95 | 0.630 | 258.0 | 31.5 | 71.0 | −0.80 | 3.5 |

*At this start of the esterification, 0.5 mol % of lithium acetate anhydride was added.
**Calculated using the same Huggins' constant as in polyethylene terephthalate.

What is claimed is:

1. A process for producing polyesters which comprises esterifying an aromatic dicarboxylic acid (A) and a bis-β-hydroxyethyl ester (B) of said aromatic dicarboxylic acid in the presence or absence of an esterification catalyst, and then heating the esterified product at reduced pressure in the presence of a polycondensation catalyst, wherein 1. said dicarboxylic acid (A) is reacted in an amount in excess of one-half mol and not larger than 6/5 mols per mol of said hydroxyethyl ester (B), and
2. at a time after the esterification reaction conversion has reached 70 %, the hydroxyethyl ester (B) is additionally supplied in an amount of $x$ mol per mol of the total amount of said aromatic dicarboxylic acid (A) used for the esterification, $x$ being defined by the following equations:

a. where the mol ($y$) of said aromatic dicarboxylic acid is $1/2 < y < 8/9$,
$$0.03y - 0.015 \leq x \leq (2y-1)/(y+1) \qquad (1)$$

b. where the mol ($y$) of said aromatic dicarboxylic acid is $8/9 \leq y \leq 6/5$,
$$0.476y - 0.411 \leq x \leq (2y-1)/(y+1) \qquad (2)$$

and thereafter, said polycondensation reaction is performed.

2. The process of claim 1, wherein the amount of said hydroxyethyl ester (B) further satisfies the equation $x \leq 0.3$.

3. The process of claim 1, wherein the amount ($x$ mol) of said additional hydroxyethyl ester (B) satisfies the following equations a. where the mol ($y$) of said dicarboxylic acid (A) is $1/2 < y < 8/9$,
$$0.06y - 0.03 \leq x \leq (2y-1)/(y+1) \qquad (1)'$$

b. where the mol ($y$) of said dicarboxylic acid (A) is $8/9 \leq y \leq 6/5$,
$$0.476y - 0.401 \leq x \leq 0.22y - 0.01 \qquad (2)'$$

4. The process of claim 1, wherein the amount of said dicarboxylic acid is above one-half mol but less than eight-ninths mol per mol of said hydroxyethyl ester (B), and the amount of said additional hydroxyethyl ester (B) satisfies the following equations:

a. where the mol ($y$) of said dicarboxylic acid (A) is $1/2 < y \leq 0.5968$,
$$0.03y - 0.015 < x \leq (2y-1)/(y+1) \qquad (1)'$$

(b) where the mol ($y$) of said dicarboxylic acid (A) is $0.5968 < y < 8/9$,
$$0.03y - 0.015 < x \leq 0.22y - 0.01 \qquad (2)'$$

5. The process of claim 4, wherein said esterification is performed in the copresence of a third component selected from the group consisting of other dibasic acids, bis-hydroxyethyl esters of said dibasic acids, diols and ester-forming derivatives of said diols, in an amount of not more than 20 mol % based on the total amount in mols of said dicarboxylic acid (A), hydroxyethyl ester (B) and the third component itself.

6. The process of claim 1, wherein the esterification is carried out in the absence of a catalyst substantially having an ester-interchange ability, and the polymerization catalyst is added at a time when the esterification reaction conversion has reached at least 70 %.

* * * * *

UNITED STATES PATENT OFFICE
CERTIFICATE OF CORRECTION

Patent No. 3,819,584          Dated June 25, 1974

Inventor(s) SHIMA, ET AL.

It is certified that error appears in the above-identified patent and that said Letters Patent are hereby corrected as shown below:

In the heading, insert:

-- Claims priority, application Japan, filed June 18, 1971, No. 71/43825 --

Signed and sealed this 8th day of October 1974.

(SEAL)
Attest:

McCOY M. GIBSON JR.
Attesting Officer

C. MARSHALL DANN
Commissioner of Patents